(12) United States Patent
Lippincott

(10) Patent No.: US 7,088,371 B2
(45) Date of Patent: Aug. 8, 2006

(54) MEMORY COMMAND HANDLER FOR USE IN AN IMAGE SIGNAL PROCESSOR HAVING A DATA DRIVEN ARCHITECTURE

(75) Inventor: Louis A. Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 10/609,042

(22) Filed: Jun. 27, 2003

(65) Prior Publication Data

US 2004/0263524 A1    Dec. 30, 2004

(51) Int. Cl.
*G06F 12/06* (2006.01)
*G06F 13/00* (2006.01)
*G09G 5/36* (2006.01)

(52) U.S. Cl. .................... 345/573; 345/537; 345/559
(58) Field of Classification Search ........ 345/572–573, 345/540–542, 554, 502, 505, 531, 506, 536–538, 345/544, 559, 564; 711/127, 149, 153, 157
See application file for complete search history.

(56) References Cited

U.S. PATENT DOCUMENTS 5,790,130 A * 8/1998 Gannett ..................... 345/587

| | | | |
|---|---|---|---|
| 6,370,601 B1 | 4/2002 | Baxter | |
| 6,421,744 B1 | 7/2002 | Morrison et al. | |
| 6,779,098 B1 * | 8/2004 | Sato et al. ................. | 711/168 |
| 6,785,743 B1 | 8/2004 | Sun et al. | |
| 2002/0156993 A1 | 10/2002 | Suzuoki et al. | |
| 2004/0236877 A1 * | 11/2004 | Burton ........................ | 710/22 |
| 2004/0250042 A1 | 12/2004 | Mehta et al. | |

FOREIGN PATENT DOCUMENTS

JP    2003167726    6/2003

OTHER PUBLICATIONS

Intel Corporation, Intel MXP5800 Digital Media Processor, Architecture Overview, Mar. 2003, pp. 1-38, Revision 2.1.

* cited by examiner

*Primary Examiner*—Kee M. Tung
(74) *Attorney, Agent, or Firm*—Blakely, Sokoloff, Taylor & Zafman LLP

(57) ABSTRACT

Disclosed is an image signal processor for use in an image processing system. The image signal processor includes a local memory to store data and a memory command handler having a plurality of memory address generators. Each memory address generator generates a memory address to the local memory and interprets a command to perform an operation on the data of the local memory located at the memory address to aid in image processing tasks.

30 Claims, 7 Drawing Sheets

| 15 | 14 | 13 | 12 | 11 | 10 | 9 | 8-0 | |
|---|---|---|---|---|---|---|---|---|
| 0 | 0 | X | X | X | X | X | X | Read Immediate |
| 1 | 0 | X | X | X | X | X | X | Write Immediate |
| 0 | 1 | 0 | X | X | X | X | X | Read Indirect |
| 0 | 1 | 1 | X | X | X | X | X | Write Indirect |
| 1 | 1 | 0 | 1 | X | X | X | X | Write Increment Registers |
| 1 | 1 | 0 | 0 | 0 | X | X | X | Set Data Path |
| 1 | 1 | 0 | 0 | 1 | 0 | 0 | X | Set Read Operation Complete |
| 1 | 1 | 1 | 0 | 0 | X | X | X | Write Memory Pointer Register |
| 1 | 1 | 1 | 0 | 1 | X | X | X | Write Base Offset |
| 1 | 1 | 1 | 1 | 0 | X | X | X | Write Mask Register |
| 1 | 1 | 1 | 1 | 1 | X | X | X | Write First Use Register |

| MCH Command | Description |
|---|---|
| 702 — Write Mask | Used in address calculations to create circular buffer addressing |
| 704 — Set Data Path DV Bits | Determines the target PE(s) for the read data |
| 706 — Read Immediate | Reads RAM from a specified address |
| 708 — Write Immediate | Writes RAM from the Data CCR to a specified RAM address |
| 710 — Write MPR | An initial offset value to be used in address calculations |
| 712 — Write Increment Register | Provides X and Y increment values for one or 2D addressing |
| 714 — Write Base Offset Register | Sets the Base Offset Register used in addressing |
| 716 — Read Indirect N Words | Reads N words into the Data CCR using the MAG Memory Pointer |
| 718 — Write Indirect N Words | Writes N words from the Data CCR using the MAG Memory Pointer |
| 720 — Read OP Complete | Used to signal the MCH control PE that a block transfer is complete |
| 722 — Infinite Indirect Operation | Set infinite indirect MCH operation |

MEMORY COMMAND HANDLER FOR USE IN AN IMAGE SIGNAL PROCESSOR HAVING A DATA DRIVEN ARCHITECTURE

FIELD

Embodiments of the invention relate to the field of image processing. More particularly, embodiments of the invention relate to a memory command handler for use in an image signal processor having a data driven architecture.

DESCRIPTION OF RELATED ART

Generally, image processing is the application of signal processing techniques to the domain of the two-dimensional images such as photocopies, scanned images, photographs, video, etc. Typically, image processing involves analyzing and manipulating images and is performed utilizing electronic means. Image processing generally involves three operations: importing an image with a device such as an optical scanner or directly through some other type of device (e.g. digital camera, digital camcorder, etc.); manipulating or analyzing the image in some way; and lastly outputting the result.

Although not always, but in many instances, the image is manipulated or analyzed by electronic means in a particular or pre-programmed way. In this stage, techniques such as image enhancement and data compression may be utilized. For example, the image may be analyzed or enhanced to find patterns that are not visible to the human eye. The analysis of a picture may utilize techniques that can identify structures, shades, colors and relationships that cannot be perceived by the human eye. In this way, image processing techniques can be utilized to identify problems, such as in forensic medicine. As another example, image processing techniques may be used in creating weather maps from satellite pictures. More generally, image processing may deal with images in bitmapped graphics formats that have been scanned in, or captured with digital cameras or the like, that may then be analyzed, manipulated, enhanced, etc. Also, often an image is improved by image processing techniques such as by refining a degraded image that has been previously scanned or entered from a video source.

As one particular example, image processing in document imaging applications has traditionally been handled by high-performance fixed-function Application Specific Integrated Circuits (ASICs). However, these fixed-function ASICs provide little flexibility in image processing tasks. On the other hand, programmable solutions (e.g. Field Programmable Gate Arrays (FPGAs), Digital Signal Processors (DSPs), etc.), while offering more flexibility in image processing tasks, have not offered the price vs. performance characteristics required for these applications to be competitive and widely utilized. Moreover, because of the lack of affordable, programmable and scalable solutions, products across different performance segments have not been standardized onto a common platform.

BRIEF DESCRIPTION OF THE DRAWINGS

FIG. 7 lists an example of commands that may be supported by each of the memory address generators (MAGs), according one embodiment of the present invention.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Embodiments of the invention relate to the field of image processing. More particularly, embodiments of the invention relate to a memory command handler (MCH) for use in an image signal processor having a data driven architecture. Even more particularly, embodiments of the invention relate to an image signal processor (ISP) for use in an image processor having a memory command handler (MCH) that acts as an address generator device to handle many different image processing tasks and to control a large number of parameters utilizing single commands. Further, the memory command handler includes powerful addressing capabilities by utilizing a plurality of memory address generators (MAGs), which allow for the automatic feeding of data held in, for example, two dimensional sub-sampled arrays.

Advantageously, the memory command handler using a data driven architecture in conjunction with its powerful addressing capabilities, may be used to control parameters in the memory address generators to efficiently manage image processing tasks. For example, typically, in data flow applications, such as image processing tasks, a very small set of instructions may be efficiently utilized to operate on large data streams. Embodiments of the invention relate to optimized architectures for maximizing the efficiency of image processing applications.

Figure 1:
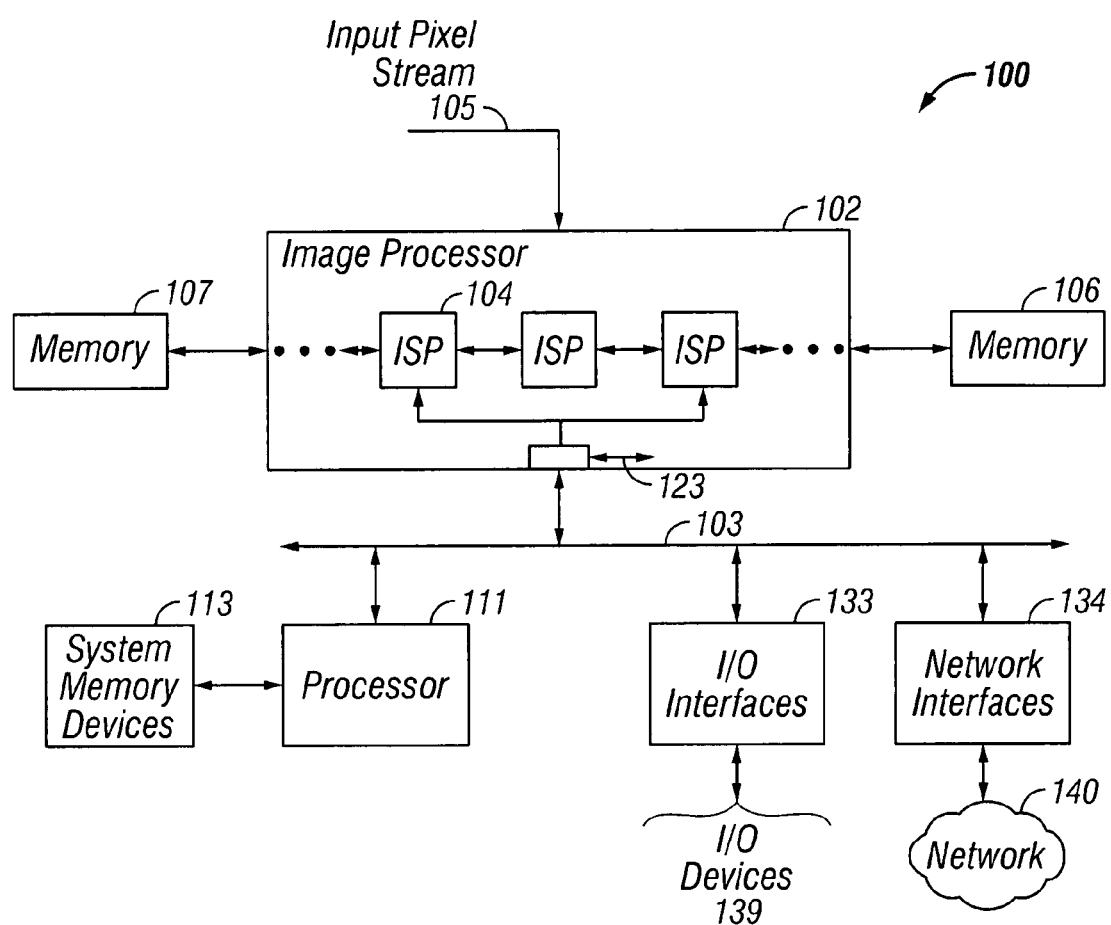
FIG. 1 is a block diagram illustrating an example of a system configuration for use in image processing, according to one embodiment of the present invention.

FIG. 1 is a block diagram illustrating an example of a system configuration 100 for use in image processing, according to one embodiment of the present invention. The system configuration 100 includes at least one image processor 102 having a plurality of individual image signal processors (ISPs) 104 coupled to one another. As is known in the art, image processors typically include a number of individual image signal processors.

However, according to embodiments of the present invention, the image processor 102 implements, a data-driven, shared register architecture, as discussed below. In one embodiment of the invention, the data paths between the image signal processors (ISPs) 104 may be 16-bits wide and may operate at a core frequency of approximately 266 MHz. As previously discussed, typically in data flow applications, a very small set of instructions operate on large data streams. The system configuration 100, according to embodiments of the present invention, is optimized to provide maximum performance on these types of image processing data flow applications. In one particular embodiment, the image processor 102 may include eight image signal processors 104 which are connected to each other through programmable ports. In one example, the programmable ports may be quad ports.

The system configuration 100, as discussed below, is highly scalable and programmable to perform image processing tasks on an input pixel stream 105 from other devices (e.g. other image processing chips or devices capable of producing an input pixel stream).

Further, in one embodiment, memory devices 106 and 107 may be coupled to the image processor 102. In one embodiment, the memory devices 106 and 107 may be Double Data Rate (DDR) Synchronous Dynamic Random Access Memories (SDRAMs). In one example, these dual DDR SDRAM devices may provide more than 1 Gbyte per second of data movement bandwidth. This data flow bandwidth may be balanced with the processing performance of the image signal processors 104.

As shown in FIG. 1, the system configuration 100 includes at least one host processor 111, input/output (I/O) interfaces 133, and a network interface 134 coupled to the image processor 102 by a bus 103. The bus 103, for example, may be a peripheral component interface (PCI) type of bus. System memory devices 113 may also be coupled to processor 111. Additionally, the system configuration 100 may include additional components (not shown) such as co-processors, modems, etc.—this being only a very basic example of a system configuration. As previously discussed, the host processor 111 may be coupled to the image processor 102 and the other components previously described by bus 103. For the purposes of the present specification, the term "processor" or "CPU" refers to any machine that is capable of executing a sequence of instructions and shall be taken to include, but not limited to, general purpose microprocessors, special purpose microprocessors, application specific integrated circuits (ASICs), multi-media controllers, microprocessors, microcontrollers, etc. In one embodiment, the processor 111 may be a general-purpose microprocessor that is capable of executing an INTEL ARCHITECTURE instruction set. For example, the processor 111 can be one of the PENTIUM classes of processors or one of the CELERON classes of processors.

The memory devices 106 and 107, as well as the system memory device 113, can include any memory device adapted to store digital information, such as static random access memory (SRAM), dynamic random access memory (DRAM), synchronous dynamic random access memory (SDRAM), and double data rate (DDR) SDRAM or DRAM, etc. Thus, in one embodiment, the memory devices 106 and 107 and the system memory device 113 include volatile memory. Further, it should be appreciated that memory devices 106 and 107 and system memory device 113 can also consist of or include non-volatile memory such as read-only memory (ROM).

Also, the system configuration 100 may include I/O interfaces and ports 133 to interface with I/O devices 139. I/O interfaces 133 include, but are not limited to, PCI slots, PCI agents, universal serial bus (USB) interfaces, Institute of Electrical Electronics Engineering (IEEE) 1394 interfaces, parallel port interfaces, phone interfaces, integrated drive electronic (IDE) interfaces (e.g. for a hard drive), high-speed serial interfaces, as well as other types of interfaces, as should be appreciated by those of skill in the art. It should also be appreciated that there are a wide variety of different types of I/O devices that may be connected through suitable I/O interfaces to the system configuration 100. Examples of I/O devices may include any I/O device to perform suitable I/O functions. For example, I/O devices may include a monitor, a keypad, a modem, a printer, storage devices (e.g. Compact Disk Rom (CD ROM), Digital Video Disk (DVD), hard drive, floppy drive, etc.) or any other types of I/O devices (e.g., input devices, mouse, trackball, pointer device), media cards (e.g. audio, video, graphics, etc.). More particularly, I/O devices may include phones, fax machines, scanners, photocopy machines, digital copiers, video cameras, digital cameras, multi-function peripherals, as well as other types of devices suitable for coupling to an image processor. Moreover, a network interface 134 may be provided to couple the system configuration 100 to a network 140. The network interface 134 is provided to communicate with a network 140 (e.g. a Local Area Network (LAN), a Wide Area Network (WAN), the Internet, etc.) using a standard and suitable network protocol, as are known in the art.

The image processor 102 of exemplary system configuration 100 may utilize the external host processor 111 and bus 103 for downloading microcode, register configuration, register initialization, interrupt servicing and for uploading and downloading image data for image processing. The data read from any of the interfaces described previously may be processed by the image signal processors 104 of the image processor 102. In one embodiment, the image signal processors 104 may be connected to each other in a shared mesh topology through quad ports to facilitate rapid and flexible movement of data across the image processor 102. In one example, the image processor 102 may include eight image signal processors (ISPs) 104. Further, a global bus 123 connects to the PCI bus 103 and is coupled to all of the image signal processors (ISPs) 104 of the image processor 102, as well as all the other functional units (not shown) of the image processor 102. The various units and registers of the image processor 102 may be set up and controlled through the global bus 123. Particularly, the global bus 123 is used to read and write the configuration registers of each ISP. In one embodiment, the global bus is 16-bits and has a 16-bit data bus and an 8-bit address bus and conveys interrupt status to the PCI bus 103.

Figure 2:
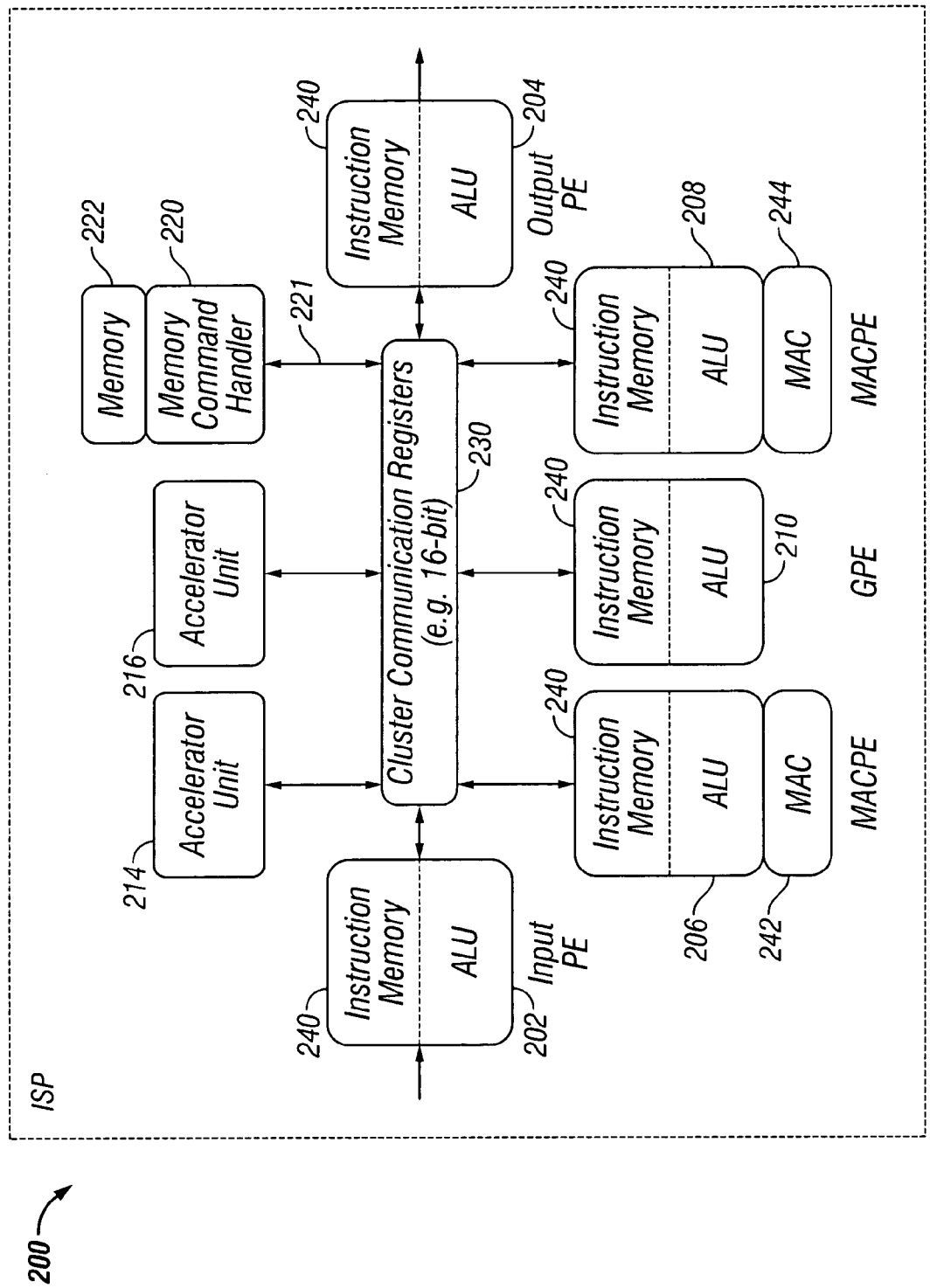
FIG. 2 is a block diagram illustrating an example of architecture for an image signal processor (ISP), according to one embodiment of the present invention.

Turning now to FIG. 2, FIG. 2 is a block diagram illustrating an example of architecture for an image signal processor (ISP) 200, according to one embodiment of the present invention. As can be seen in FIG. 2, the ISP 200 includes an input programming element (Input PE) 202, an output programming element (Output PE) 204, a first Multiply-Accumulate programming element (MACPE) 206, a second MACPE 208, a general purpose programming element (GPE) 210, first and second accelerator units 214 and 216, respectively, and a memory command handler 220, all of which are coupled to a shared memory 230. In one embodiment, the shared memory 230 may include a plurality of cluster communication registers (CCRs). In an even more particular embodiment, each cluster communication register may be 16-bits wide. The cluster communication registers (CCRs) 230 of the image signal processor 200 are used to store and transfer data between the processing elements, as is discussed below in more detail. The input and output programming elements 202 and 204 are configured to route data through the image signal processor 200. Also, the image signal processor 200 may include data storage memory 222 managed by the memory command handler 200 to maximize bandwidth access efficiency, as discussed below.

Further, each programming element 202, 204, 206, 208, and 210, respectively, includes local registers (e.g. sixteen 16-bit local registers). Both the cluster communication registers 230 and the other local registers can be used in image processing applications, for example, on either 16-bit images or dual 8-bit images. All of the processing elements may run concurrently and implement a common base line instruction set that consists of flow control instructions and arithmetic logic unit (ALU) instructions, as discussed below. Particularly, the MAC programming elements 206 and 208 respectively, may implement additional multiply-accumulate instructions and the general purpose programming element implement 210 may implement additional bit-rotation instructions. The performance of the programming elements combined with the programmability of the image signal processor (ISP) 200 allows a programmer to develop and tune algorithms rapidly for optimum performance. Also, the ISP 200 may include dedicated hardware accelerators 214 and 216. For example, these accelerator units 214 and 216 may include Huffman encoder/decoder accelerators, G4 engine accelerators, Fast 2D triangular filter accelerators, etc.

As previously discussed, image processing applications typically perform a small set of operations on large amounts of data. The image processor, and each image signal processor (ISP) 200 of the image processor, may implement a data flow/data driven architecture to implement image processing functions. In each image signal processor 200, each programming element 202, 204, 206, 208, and 210, respectively, includes an instruction memory 240 to hold instructions. In one embodiment, the instruction memory 240 may be a 128-instruction memory. Typically, an instruction set may be used that consists of three or four tight loops in addition to data flow and arithmetic instructions. Further, each programming element may have local registers (e.g. sixteen 16-bit registers) for local data storage and also has read/write access to all of the cluster communications registers (CCRs) 230. The cluster communication registers 230 are used to exchange data between the programming elements. Particularly, in one embodiment, data passing through the cluster communication registers 230 may be tagged with data valid (DV) bits. The data valid bits may be used to establish the ownership of the data storage resource and may establish one or more consumers of the data as discussed below.

Briefly summarizing, the image processor 102 of the system configuration 100 (FIG. 1) includes a plurality of image signal processors (ISPs) 200 (FIG. 2). In one embodiment the image processor includes eight image signal processors (ISPs) 200. Although, it should be appreciated that any suitable number of image signal processors can be utilized without any significant change to the architecture. Further, programming elements 202, 204, 206, 208, and 210 and hard-wired accelerators 214 and 216 are interconnected through a shared memory 230, which, in one embodiment, may be implemented as cluster communication registers (CCRs) (e.g. 16-bit registers). In one embodiment, the five programming elements in the image signal processor 200 communicate with each other through the cluster communication registers 230. In this embodiment, the cluster communication registers 230 are the only mechanism by which the five programming elements in the image signal processor 200 can communicate with each other. The memory command handler 220, as discussed below, is used to manage the data flow to the programming elements.

Looking particularly now at some of the individual components of the image signal processor 200, the programming elements (PEs) 202, 204, 206, 208, and 210 will now be particularly discussed. As previously mentioned, each programming element has its own set of local registers as well as operating in conjunction with the cluster communication registers 230. Both the local registers and the cluster communication registers, in one embodiment of the invention, may be 16-bits wide and can be used for either 16-bit operands or two 8-bit operands. Further, each programming element may be designed for a basic set of instructions. In one embodiment, the basic set of instructions may be divided into flow control instructions that support flow control, ALU instructions that support arithmetic and logic functions, as well as custom instructions. For example, as to custom instructions, the MAC programming elements (MACPEs) 206 and 208 have multiply accumulate instructions and the general purpose programming element (GPE) 210 may include bit-rotation instructions. However, all of the programming elements 202, 204, 206, 208, and 210 support all of the flow control instructions and ALU instructions.

Examples of flow control instructions include: load, read instruction memory, write instruction memory, break, conditional call, interrupt control, conditional jump, indirect register control, loop instruction, no operation, repeat, return, stop, pack, and unpack. Examples of ALU instructions include: absolute function, add function, add and accumulate function, add and shift function, subtract function, subtract and accumulate function, bit-wise AND function, bit-wise OR function, bit-wise exclusive OR function, min/max functions, store accumulator function, sign-extend function, shift left function, shift right function, and an instruction to test data valid bits. As to custom instructions for use with the MAC programming elements (MACPEs) 206 and 208, exemplary instructions include: multiply and accumulate function, multiply instruction, and mode set. As to custom instructions for the general purpose programming element (GPE) 210, an exemplary instruction includes a bit-rotation instruction.

The general purpose programming element (GPE) 210 includes the basic flow and ALU instructions previously discussed, along with the custom bit-rotation instruction, and is the basic programming element upon which all the other programming elements 202, 204, 206, and 208 are built. Thus, general purpose programming element (GPE) 210 implements the base line instruction set, as previously discussed. The input programming element 202 is based on the general purpose programming element 210 (minus the bit rotation instruction) with a quad port interface as an input port to receive incoming data. Similarly, the output programming element 204 is likewise based on the general purpose programming element 210 (minus the bit rotation instruction) with a quad port interface as an output port to output data. MAC programming elements 206 and 208 are likewise based on the general purpose programming element 210 (minus the bit rotation instruction) with enhanced MAC functionality provided by the multiply-accumulators 242 and 244, respectively. In one embodiment, MAC programming elements 206 and 208 support dual Single Instruction Multiple Data (SIMD) 8×8 instructions or single 16×16 multiply-accumulate instructions. In addition to these basic capabilities, MAC programming elements 206 and 208 provide a wide array of arithmetic and logic functions useful for implementing image processing algorithms. It should be appreciated that the multiply-accumulators 242 and 244 of the MAC programming elements 206 and 208, respectively, like any other ALU unit, can utilize data from any of the cluster communication registers (CCRs) 230 or from local registers.

Turning now to the shared memory 230, in one embodiment, the shared memory 230 may be a plurality of cluster communication registers (CCRs), as previously discussed. In one example, the cluster communication registers (CCRs) 230 may each be 16-bit registers. The cluster communication registers 230 allow the processing elements 202, 204, 206, 208 and 210 to exchange data and may be used as general purpose registers. In one embodiment, data valid (DV) bits may implement a semaphore system to coordinate data flow and cluster communication register ownership by the various processing elements.

Figure 3:
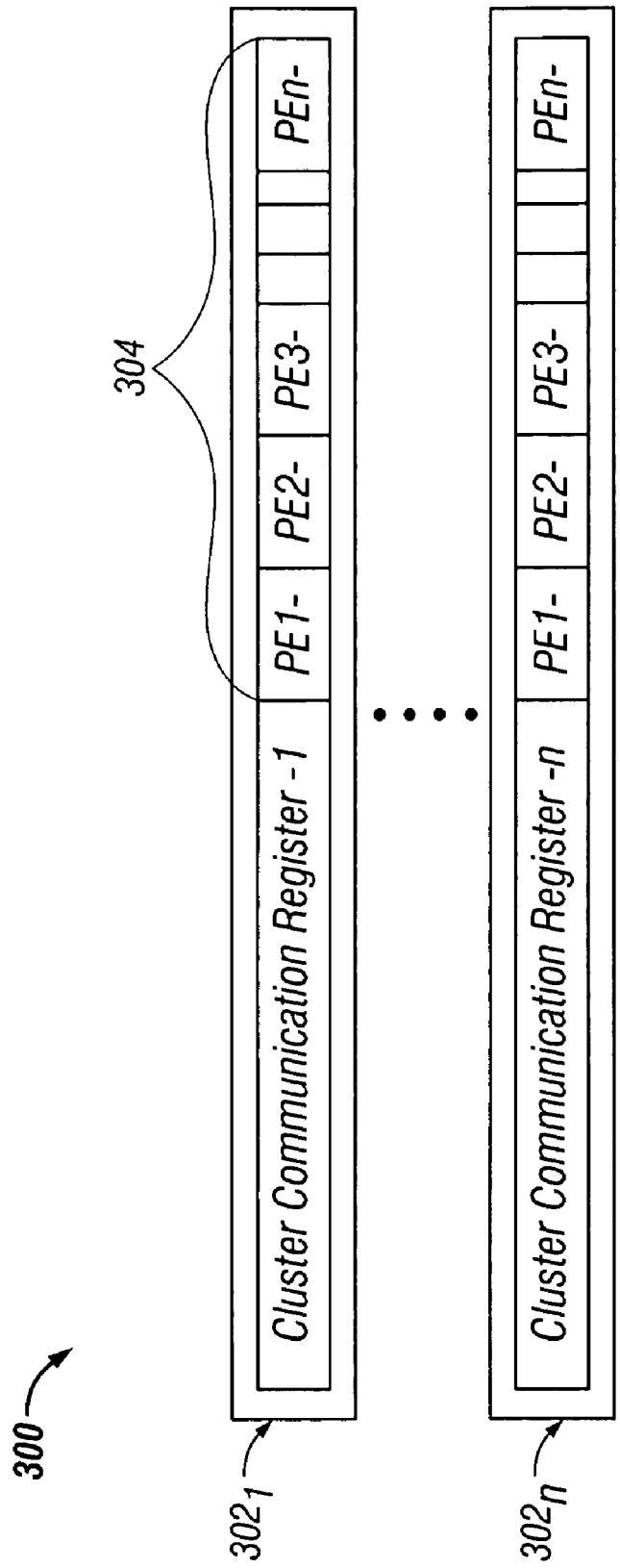
FIG. 3 is a block diagram illustrating an example of a shared memory including a plurality of cluster communication registers (CCRs), according to one embodiment of the present invention.

Referring briefly to FIG. 3, FIG. 3 illustrates an example of a shared memory 230 including a plurality of cluster communication registers (CCRs) 302$_{1-N}$, according to one embodiment of the present invention. In one embodiment, each cluster communication register 302$_{1-N}$ may include 16 data bits and has one additional data bit 304 added to it (e.g. PE1, PE2, PE3 . . . PE$_n$) for each processing element in the image signal processor 200. In this way, these additional processing element identification bits 304, termed data valid (DV) bits, may be used to indicate the ownership of each cluster communication register by which processing element. For example, the processor element identification data bit (DV bit) may be set high to indicate the processing element that currently owns the cluster communication register.

Returning again to FIG. 2, the memory command handler 220 will now be discussed in more particular detail. The memory command handler 220 may be coupled to memory 222 (e.g. data RAM), which allows for local storage of data, constants and instructions within the image signal processor (ISP) 200. It provides a scalable mechanism for local storage optimized for access patterns characteristic of image processing. The memory command handler 220 provides the means for accessing the data in structured patterns often required by image processing such as by component, by row, by column, or by 2D block. The memory command handler 220 is utilized to support independent data streams using memory address generators (MAGs), in image processing applications, as discussed below in more detail later.

As previously discussed, the data that each programming element 202, 204, 206, 208, and 210 will process typically comes through one or more of the cluster communication registers (CCRs) 230. In one embodiment of the invention, the cluster communication registers (CCRs) 230 are 16-bit wide, and therefore require 16-bit wide data paths. Thus, in this embodiment, all communication to the memory command handler 220 is therefore required to be done through the same 16-bit data path 221. The restricted 16-bit data path 221 creates several problems around setting up and controlling the memory command handler 220. For example, the narrow data path limits the number of commands and the information contained in each command. However, 16-bit data paths are optimal for image processing applications because a single pixel is usually represented by a sub-sampled color space in 16-bits, such as YU, YV or La, Lb or YCr, YCb, etc. Moreover, as an example, the memory command handler 220, according to one embodiment, as discussed below, may operate utilizing a 16-bit data path in a unique and efficient manner.

As a brief overview, generally, embodiments of the present relate to an image signal processor that includes a memory command handler having a plurality of memory address generators that are coupled to a local memory, which stores data related to image processing. Each memory address generator generates a memory address to the local memory and interprets a command to be performed on the data of the local memory located at the memory address to aid in image processing tasks. A shared memory is coupled to the plurality of memory address generators and is used to store data to be sent to the local memory and commands to be performed by the memory address generators. In one embodiment, the shared memory may comprise a plurality of cluster communication registers that interface with the memory address generators by the use of a cluster communication register interface. The plurality of cluster communication registers may include data cluster communication registers to store data and command cluster communication registers to store commands.

Particularly, a pair of cluster communication registers may be assigned to each memory address generator, wherein each pair of cluster communication registers includes a data cluster communication register and a command cluster communication register. Further, discussed below, the memory command handler includes an arbiter to arbitrate access to the local memory by the memory address generators. Also, in one particular embodiment, the plurality of cluster communication registers may be at least 16-bit registers and 16-bit wide data paths may be used to couple the cluster communication registers to the memory address generators, the memory address generators to the arbiter, and the arbiter to the local memory.

Figure 4:
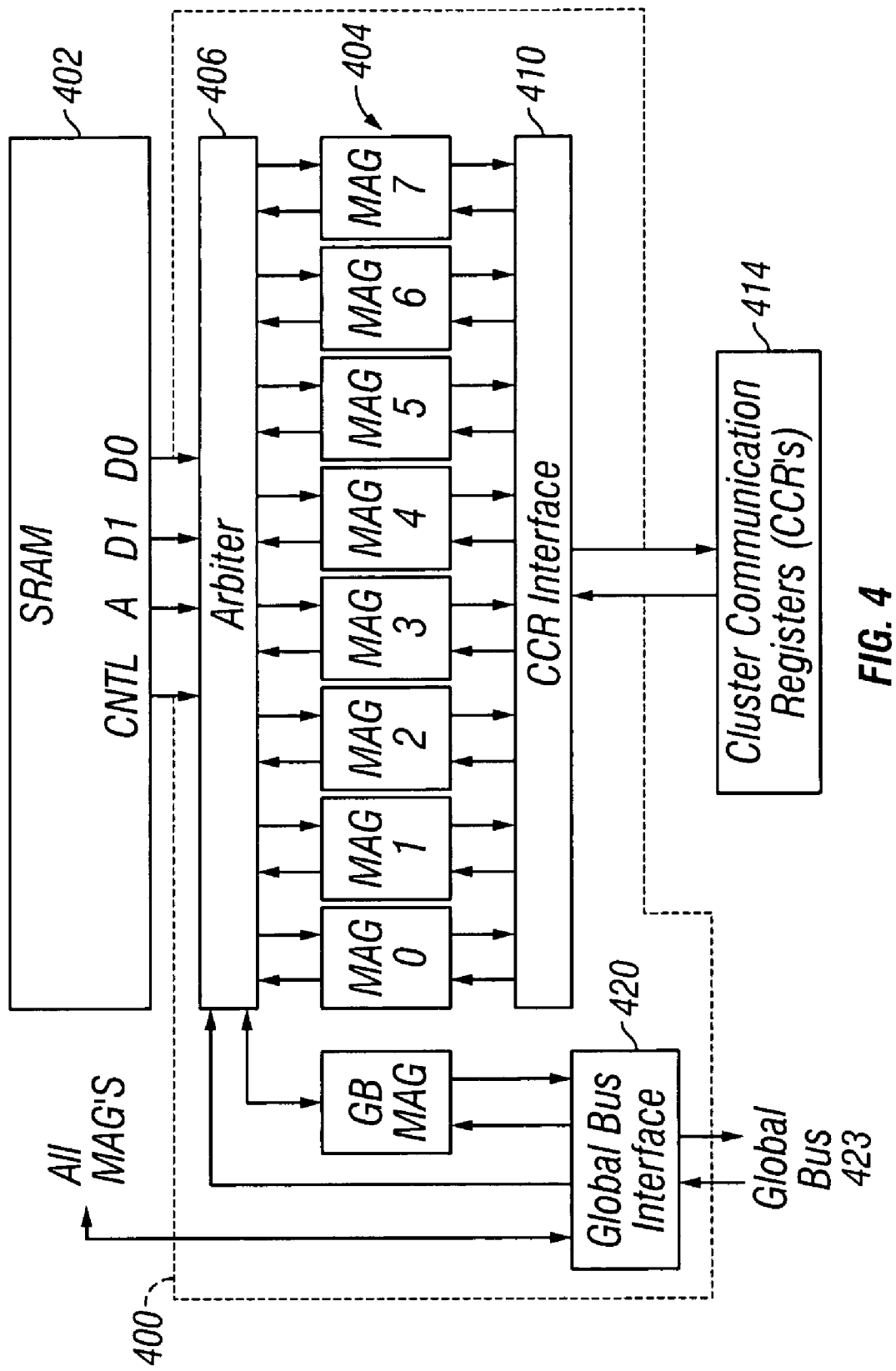
FIG. 4 is a block diagram illustrating a memory command handler, according to one embodiment of the present invention.

With reference now to FIG. 4, FIG. 4 shows a block diagram illustrating a memory command handler 400, according to one embodiment of the invention. The memory command handler 400, in conjunction with local memory 402, provides a means for accessing data and structured patterns often required by image processing such as by component, by row, by column, or by 2D block. The memory command handler 400 operates in conjunction with local memory 402 and includes a plurality of memory address generators (MAGs) 404, an arbiter 406, a cluster communication register (CCR) interface 410 for coupling to cluster communication registers (CCRs) 414, and a global bus interface 420. The memory address generators (MAGs) 404 (e.g. GB MAG, MAG0, MAG1 . . . MAG7) are utilized to support independent data streams.

Particularly, in the embodiment shown in FIG. 4, nine memory address generators (MAGs) 404 are utilized to support up to eight independent data streams to and from the cluster communication register (CCRs) 414 utilizing MAGs 0–7 and another independent data stream from the global bus 423 through the global bus interface 420 utilizing the global bus (GB) MAG. However, it should be appreciated that any number of memory address generators may be utilized to support any number of suitable data streams. Each of the MAGs 0–7 are coupled to the cluster communication registers (CCRs) 414 through the cluster communication register (CCR) interface 410, respectively, as well as to the arbiter 406, and the GB MAG is coupled directly to the arbiter 406. The arbiter 406 on a clock cycle basis controls access to the memory 402.

Further, a global bus interface 420 couples the memory command handler 400 to the global bus 423 and all the other MAGs of all the other ISPs of the image processor. The global bus 423 connects to the PCI bus and is coupled to all of the other image signal processors (ISPS) of the image processor, as well as all the other functional units (not shown) of the image processor. The various units and registers of the image processor may be set up and controlled through the global bus 423. Particularly, the global bus 423 is used to read and write the configuration registers of each ISP. In one embodiment, the global bus is 16-bits wide and includes a 16-bit data bus and an 8-bit address bus and conveys interrupt status to the PCI bus. The memory command handler 400 may be programmed through the global bus interface 420 for all commands to the memory address generators 404.

Data to the memory 402 is communicated through the cluster communication registers (CCRs) 414, utilizing MAGs 0–7 404, as well as through some commands. Additionally, data to the memory 402 may be communicated from the global bus 423, including data from other MAGs of other ISP's utilizing the GB MAG.

Each of the components of the memory command handler 400 and the memory 402 will now be particularly discussed. Starting with the memory 402, in one embodiment, the memory 402 may be static random access memory (SRAM). The SRAM 402, in one embodiment, may be organized as N addresses of 16-bit words. The SRAM 402 appears to software as one contiguous area of memory. As shown in FIG. 4, the SRAM block 402 has a data-in port (DI), a data-out port (DO), a control port (CNTL) and an address port (A), all of which are coupled to arbiter 406.

Looking now to the arbiter 406, the arbiter 406 accepts all requests for access to the SRAM block 402 from the memory address generators (MAGs) 404 and arbitrates for ownership of the memory control (CNTL), address (A), and data (DI and DO) busses. The arbiter 406 implements, in one embodiment, a round-robin type of arbitration where the last memory address generator 404 granted access assumes the lowest priority, the next memory address generator 404 assumes the highest priority, and the descending priority chain is forwarded through each sequential memory address generator. The arbiter 406 decides on a clock-by-clock basis which memory address generator 404 gets to perform a memory access cycle.

Turning now to the cluster communication register (CCR) interface 410, the CCR interface 410 connects the memory address generators (MAGs) 404 (e.g. MAGs 0–7) to the cluster communication registers 414 for passing data and commands to and from the SRAM block 402 via the memory address generators. The memory address generators 404 (e.g. MAGs 0–7) are connected to specific pairs of cluster communication registers (CCRs) 414. Each pair of cluster communication registers (CCRs) includes one command CCR and one data CCR. The command CCRs are used to send various read and write commands to the memory address generators 404. The data CCRs are used to send the data words to the SRAM block 402 via the memory address generators 404.

In one embodiment, an appropriate data valid (DV) bit may be set in the cluster communication register (CCR) 414 for the memory command handler 400 and by using the cluster communication register for that particular memory address generator (MAG) 404 a specific memory address generator 404 (e.g. one of MAGs 0–7) is selected. If the memory command handler 400 data value (DV) bit is not set, the memory command handler 400 does not respond to the command or data in the cluster communication register. This allows the cluster communication registers (CCRs) 414 to be used to communicate with other programming elements even though the cluster communication register is connected to a particular memory address generator within the memory command handler. Conversely, when the memory address generator returns data through a cluster communication register any combination of data valid (DV) bits can be set returning the data to any combination of programming elements in the overall image signal processor.

Figure 5:
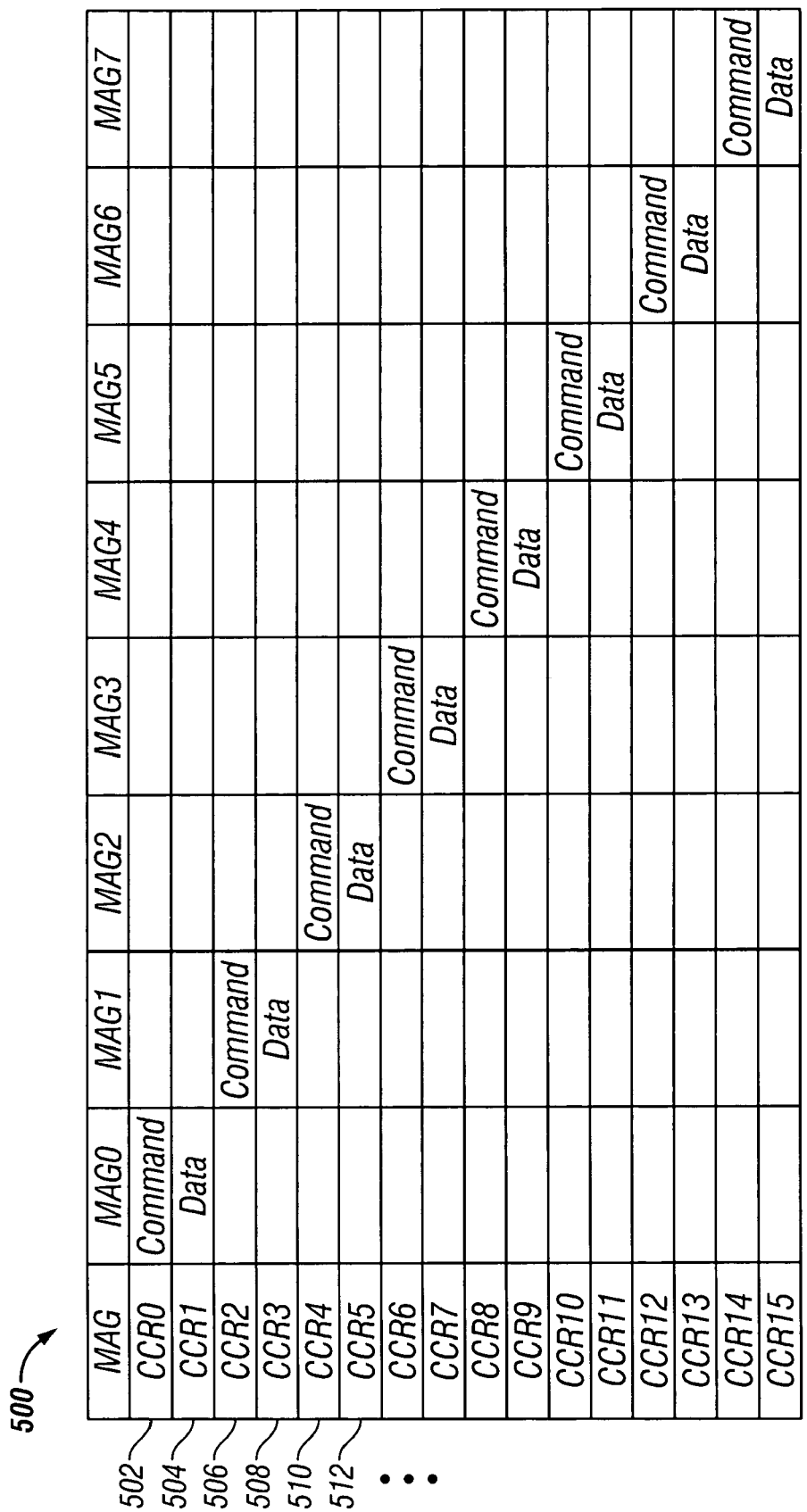
FIG. 5 illustrates an example of memory address generators (MAGs) mapped to cluster communication registers (CCRs), according to one embodiment of the present invention.

Looking briefly at FIG. 5, FIG. 5 illustrates an example of memory address generators (MAGs) mapped to particular cluster communication registers (CCRs), according to one embodiment of the present invention. As shown in FIG. 5, CCR0 and CCR1 are assigned to MAG0 for command and data 502 and 504, respectively. CCR2 and CCR3 are assigned to MAG1 for command and data 506 and 508, respectively, CCR4 and CCR5 are assigned to MAG2 for command and data 510 and 512, respectively, etc.

Returning to FIG. 4, the memory address generators (MAGs) 404 will now be discussed. The memory address generators (MAGs) 404 are used to generate the address for each word passed through the data cluster communication registers 414 into the SRAM memory block 402 and to interpret the commands sent to the memory address generators 404 through the command cluster communication registers 414, as well as from the global bus 423 through the GB MAG. In one embodiment there are nine memory address generators (MAGs) 404 in each memory command handler in each image signal processor. Each memory address generator (MAG) includes a command interpreter that receives commands via the command cluster communication register (CCR) 414 or global bus 423 and decodes them into various functions supported by the memory address generator, as discussed below in more detail.

Advantageously, each memory address generator (MAG) 404 is particularly optimized for image processing algorithms, such that it can handle 2D arrays in a variety of formats and dimensions. The power and flexibility of each memory address generator (MAG) 404 is created by the various parameters that are programmed by the processing elements through the cluster communication registers 414. Advantageously, embodiments of the invention allow the commands to be a single 16-bit word.

Figures 6, 8:
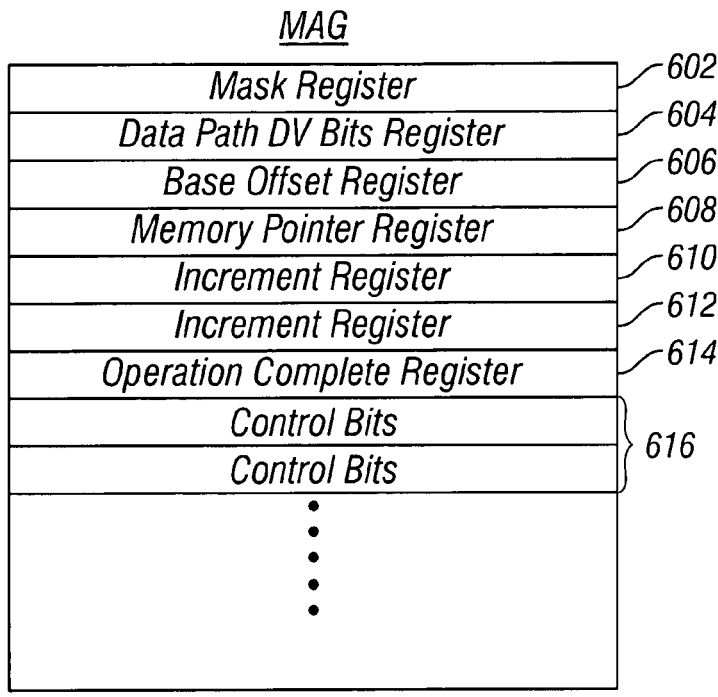
FIG. 6 is a block diagram showing a variety of registers that may be utilized within a memory address generator (MAG), according to one embodiment of the present invention.
FIG. 8 is a diagram illustrating one example of a method of encoding commands, according to one embodiment of the present invention.

The memory address generators (MAGs) 404 of the memory command handler 400, according to embodiments of the invention, obtain their flexible capabilities through the use of several offset registers, counters, pointers, etc. Turning briefly to FIG. 6, FIG. 6 is a block diagram showing a variety of registers that may be utilized within a memory address generator (MAG) 404, according to one embodiment of the present invention. As shown in FIG. 6, each memory address generator 404 may contain a: mask register 602, data path data valid (DV) bits register 604, base offset register 606, memory pointer register 608, first increment register 610, a second increment register 612, operation complete register 614, and registers for various control bits 616. Of course, each memory address generator 404 may include additional registers not shown here. Further, the encoding for commands may be accomplished in a way that allows for the maximum number of bits for parameters.

As previously discussed, a command interpreter of each memory address generator 404 receives commands via a command cluster communication register (CCR) 414 and encodes them into various functions supported by the particular memory address generator. With reference now to FIG. 7, FIG. 7 lists an example of commands that may be supported by each of the memory address generators (MAGs) 404, according one embodiment of the present invention. As shown in FIG. 7, these commands include, but are not limited to: a write mask command 702 utilized in address calculations to create circular buffer addressing; set data path data valid (DV) bits 704 to determine the target processing elements for the read data; a read immediate command 706 to read RAM from a specified address; a write immediate command 708 to write RAM from the data cluster communication register (CCR) to a specified RAM address; a write MPR command 710 which provides an initial offset value to be used in address calculations; a write increment register command 712 to provide X and Y increment values for 1D or 2D addressing; a write base offset register command 714 to set the base offset register used in addressing; a read indirect, N words command 716 to read N words into the data cluster communication register (CCR) using the memory address generator (MAG) memory pointer; a write indirect, N words command 718 to write N words from the data CCR using the MAG memory pointer; a read op complete command 720 which is used to signal the memory command handler (MCH) controlling a processing element that a block transfer is complete; and an infinite indirect operation command 722 to set infinite indirect memory command handler (MCH) operations.

Turning now to FIG. 8, FIG. 8 shows a diagram illustrating one example of a method of encoding commands, according to one embodiment of the present invention. For example, as shown in FIG. 8, the read immediate command is encoded as 00 in the top two bits of the 16-bit data path example. This leaves 14 bits left over for the immediate address that would be included in the command, which gives each memory address generator (MAG) the ability to directly address, in one example, 32 KB of data. It should also be noted that the read immediate bits are purposely chosen to be 00 so that a lookup table can be implemented by simply writing the lookup input table as the command. For example, writing a 0057h to the command cluster communication register (CCR) will cause read immediate to location 0057h in the RAM, which would return the new output value for that input value. Of course the base offset register can offset the look up table address. Also, it should be noted, that some commands do not need as much parameter data and may be encoded as longer commands. An example of this is the set read operation complete register, which, in this example, needs only nine bits of parameter data. For example, as shown in FIG. 8, many of the commands have fixed values (i.e. 0 or 1).

Thus, the image processor having image signal processors (ISPs) utilizing the memory command handler (MCH) according to embodiments of the present invention, provides address generating functionality that can handle many different image processing tasks and can control a large number of parameters with, in one example, single 16-bit commands. The powerful addressing capability of the memory address generators (MAGs) and the memory command handler advantageously provides for the automatic feeding of data, such as in two dimensional, sub-sampled arrays. Further, the image processor having image signal processors (ISPs) utilizing the memory command handler (MCH) according to embodiments of the present invention, provides the performance of an ASIC with the programmability of a processor. Moreover, the architecture provides the flexibility to implement, in one embodiment, a wide range of document processing image paths (e.g. high ppm monochrome, binary color, contone color, MRC-based algorithms, etc.) while accelerating the execution of frequently used imaging functions (e.g. color conversion, compression, and filter operations).

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An image signal processor comprising:
   a local memory to store data;
   a memory command handler circuit including a plurality of memory address generators, each memory address generator to generate a memory address to the local memory and to interpret a command to be performed on the data of the local memory located at the memory address to aid in image processing tasks; and
   a plurality of cluster communication registers coupled to the plurality of the memory address generators, the plurality of cluster communication registers storing data to be sent to the local memory and commands to be performed by the memory address generators.

2. The image signal processor of claim 1, further comprising a cluster communication register interface to couple the plurality of cluster communication registers to the plurality of memory address generators.

3. The image signal processor of claim 1, wherein the plurality of cluster communication registers include data cluster communication registers to store data and command cluster communication registers to store commands.

4. The image signal processor of claim 3, wherein a pair of cluster communication registers are assigned to each memory address generator.

5. The image signal processor of claim 4, wherein each pair of cluster communication registers includes a data cluster communication register and a command cluster communication register.

6. The image signal processor of claim 1, further comprising an arbiter to arbitrate access to the local memory by the memory address generators.

7. The image signal processor of claim 6, wherein the plurality of cluster communication registers are at least 16-bit registers.

8. The image signal processor of claim 7, further comprising 16-bit data paths that couple the cluster communication registers to the memory address generators, the memory address generators to the arbiter, and the arbiter to the local memory.

9. The image signal processor of claim 8, wherein the local memory includes static random access memory (SRAM).

10. A method comprising:
storing data in a local memory of an image signal processor;
generating a memory address to the local memory utilizing a memory address generator of a memory command handler circuit located within the image signal processor;
performing an operation on the data of the local memory located at the memory address utilizing the memory address generator to aid in image processing tasks;
storing data to be sent to the local memory in a plurality of cluster communication registers of the image signal processor; and
storing commands in the plurality of cluster communication registers to be performed on the data in the local memory.

11. The method of claim 10, wherein the plurality of cluster communication registers include data cluster communication registers to store data and command cluster communication registers to store commands.

12. The method of claim 11, further comprising assigning a pair of cluster communication registers to one of a plurality of memory address generators, each memory address generator to generate a memory address to the local memory within the image signal processor and to perform an operation on the data of the local memory located at the memory address to aid in image processing tasks.

13. The method of claim 12, further comprising arbitrating access to the local memory by the plurality of memory address generators.

14. The method of claim 10, wherein the plurality of cluster communication registers are at least 16-bit registers.

15. The image processor of claim 14, wherein 16-bit data paths couple the cluster communication registers to the memory address generators and the memory address generators to the local memory.

16. A machine-readable medium having stored thereon instructions, which when executed by a machine, cause the machine to perform the following operations comprising:
storing data in a local memory of an image signal processor;
generating a memory address to the local memory utilizing a memory address generator of a memory command handler circuit located within the image signal processor;
performing an operation on the data of the local memory located at the memory address utilizing the memory address generator to aid in image processing tasks;
storing data to be sent to the local memory in a plurality of cluster communication registers of the image signal processor; and
storing commands in the plurality of cluster communication registers to be performed on the data in the local memory.

17. The machine-readable medium of claim 16, wherein the plurality of cluster communication registers include data cluster communication registers to store data and command cluster communication registers to store commands.

18. The machine-readable medium of claim 17, further comprising assigning a pair of cluster communication registers to one of a plurality of memory address generators, each memory address generator to generate a memory address to the local memory within the image signal processor and to perform an operation on the data of the local memory located at the memory address to aid in image processing tasks.

19. The machine-readable medium of claim 18, further comprising arbitrating access to the local memory by the plurality of memory address generators.

20. The machine-readable medium of claim 16, wherein the plurality of cluster communication registers are at least 16-bit registers.

21. The machine-readable medium of claim 20, wherein 16-bit data paths couple the cluster communication registers to the memory address generators and the memory address generators to the local memory.

22. An image processor system comprising:
a processor coupled to an image processor; and
a double data rate synchronous dynamic random access memory (DDR SDRAM) coupled to the image processor, the image processor including a plurality of image signal processors coupled to one another, each image signal processor including:
a local memory to store data,
a memory command handler circuit including a plurality of memory address generators, each memory address generator to generate a memory address to the local memory and to interpret a command to be performed on the data of the local memory located at the memory address to aid in image processing tasks; and
a plurality of cluster communication registers coupled to the plurality of the memory address generators, the plurality of cluster communication registers storing data to be sent to the local memory and commands to be performed by the memory address generators.

23. The image processor system of claim 22, further comprising a cluster communication register interface to couple the plurality of cluster communication registers to the plurality of memory address generators.

24. The image processor system of claim 22, wherein the plurality of cluster communication registers include data cluster communication registers to store data and command cluster communication registers to store commands.

25. The image processor system of claim 24, wherein a pair of cluster communication registers are assigned to each memory address generator.

26. The image processor system of claim 25, wherein each pair of cluster communication registers includes a data cluster communication register and a command cluster communication register.

27. The image processor system of claim 22, further comprising an arbiter to arbitrate access to the local memory by the memory address generators.

28. The image processor system of claim 27, wherein the plurality of cluster communication registers are at least 16-bit registers.

29. The image processor system of claim 28, further comprising 16-bit data paths that couple the cluster communication registers to the memory address generators, the memory address generators to the arbiter, and the arbiter to the local memory.

30. The image processor system of claim 29, wherein the local memory includes static random access memory (SRAM).

* * * * *